United States Patent [19]

Monahan et al.

[11] 4,028,664

[45] June 7, 1977

[54] APPARATUS FOR DISPATCHING DATA OF THE HIGHEST PRIORITY PROCESS HAVING THE HIGHEST PRIORITY CHANNEL TO A PROCESSOR

[75] Inventors: Earnest M. Monahan, Phoenix; Garvin W. Patterson, Glendale, both of Ariz.

[73] Assignee: Honeywell Information Systems, Inc., Waltham, Mass.

[22] Filed: Mar. 26, 1975

[21] Appl. No.: 562,314

[52] U.S. Cl. .......................................... 340/172.5
[51] Int. Cl.² ........................................ G06F 9/18
[58] Field of Search .............................. 340/172.5

[56] References Cited

UNITED STATES PATENTS

| | | | |
|---|---|---|---|
| 3,648,252 | 3/1972 | Thron et al. | 340/172.5 |
| 3,676,861 | 7/1972 | Ruth | 340/172.5 |
| 3,702,462 | 11/1972 | England | 340/172.5 |
| 3,812,463 | 5/1974 | Lahti | 340/172.5 |

Primary Examiner—David H. Malzahn
Attorney, Agent, or Firm—Nicholas Prasinos; Ronald T. Reiling

[57] ABSTRACT

A dispatcher mechanism for assigning to a processor the highest priority peripheral having the highest priority request. In a data processing system having at least one processor, and a plurality of peripheral devices coupled to a system interface unit SIU utilized for communication between said processor and peripheral devices, and also having a plurality of processes competing for control of said processor, a priority interrupt mechanism determines the highest priority peripheral having the highest priority request and then provides an interrupt signal to the processor. A release instruction REL is used to exit the process. The dispatcher mechanism dispatches data to the processor upon request from the processor in order to give control of the processor to the highest priority request.

9 Claims, 8 Drawing Figures

APPARATUS FOR DISPATCHING DATA OF THE HIGHEST PRIORITY PROCESS HAVING THE HIGHEST PRIORITY CHANNEL TO A PROCESSOR

The following patent applications filed in the U.S. Patent Office on an even date with the instant application and assigned to the same assignee as the instant application are hereby incorporated by reference to this application.

A. Processor for Input-Output Processing System, invented by G. Porter, et al., having U.S. Ser. No. 562,317 and filed in the U.S. Pat. Office on 3-26-75, now U.S. Pat. No. 3,976,977.

B. Priority Interrupt Mechanism, invented by E. Michael Monahan, G. Wesley Patterson and Jaime Calle, having U.S. Ser. No. 562,315 and filed in the U.S. Patent Office on 3-26-75.

C. Fail Soft Memory, invented by G. Porter, J. Calle and G. Wesley Patterson, having U.S. Ser. No. 562,361 and filed in the U.S. Patent Office on 3-26-75.

BACKGROUND OF THE INVENTION

1. Field of the Invention

This invention relates to data processing systems and more particularly to an apparatus and a method for interrupting and assigning processes to a processor on a priority bias.

2. Description of the Prior Art

In a general purpose computer system and particularly in a multiprogram-multiprocessing computer environment, processes are continuously vying with each other for control of one or more processors. In most prior art digital computers, there are some means of interrupting a program executing on a processor upon demand from an internal or external signal. Generally, the processor of the computer system is interrupted by the occurrence of certain predetermined events which require immediate attention by the processor. Generally in most machines, the interrupt is accomplished by selecting an address of another instruction in another program to execute a new routine, and is generally accomplished totally by software. Before execution of the new program is commenced however, certain registers containing information about the interrupt program must be saved in order to be able to return to the interrupted program at the exact point of interruption. The saving of these registers during the period of interrupt and again the reloading of the registers when the interrupted program is ready to resume is time consuming, but tolerable in a mono processor, mono program environment. However, in a multiprogram-multiprocessor environment, the overhead burden for housekeeping becomes intolerable. Accordingly, operational registers are provided which are unique to each stored program so that a change of control between programs requires no intervention by an executive program to unload or reload the registers. (See U.S. Pat. No. 3,226,694 issued Dec. 28, 1965 to Harry D. Wise, entitled Interrupt System).

As the multiprogramming-multiprocessing environment became more complex, it became necessary to assign priorities to processes so that a process requesting control of a processor could interrupt another process having a lower priority. However, because of the software nature of the interrupt, it often was necessary to interrupt a high priority process to determine whether or not the requesting process did in fact have a higher or lower priority than the executing process. Often it was discovered that the requesting process had a lower priority than the executing process whereupon the executing process continued to run. However, during the time that was consumed to determine which one of the two, the executing or requesting process had higher priority, a higher priority process had in fact been interrupted by a lower priority process, merely to make the determination.

What is needed, therefore, is a priority interrupt mechanism to monitor and determine if an executing process has higher or lower priority than a requesting process, prior to the actual interrupt of the executing process and a dispatching mechanism to address and provide data to the highest priority process upon and interrupt.

OBJECTS OF THE INVENTION

It is a primary object of the invention therefore to provide an improved dispatching mechanism for a general purpose computer system.

It is another object of the invention to provide a hardware mechanism for a general purpose computer system to continuously monitor interrupt-requesting processes and determine whether or not an executing process has a higher or lower priority than the process requesting control of the processor prior to the actual interruption of the executing process and dispatch data to the highest priority process.

It is yet another object of the invention to determine a priority level based on port or peripheral unit number of a general purpose computer system when two or more interrupt requests having the same priority level are simultaneously seeking processor control and dispatch data to the highest priority process having the highest priority port.

SUMMARY OF THE INVENTION

In accordance with the above and other objects of the invention, a priority interrupt and dispatcher mechanism is provided to continuously monitor internal or external interrupt requests from processses desiring control of the processor and determine whether or not the requesting processes have a higher level of priority than the executing process and award control of the processor to the highest priority process on the highest priority port.

Interrupts in the processor are assigned to one of eight priority levels (although any number of priority levels may be utilized) with level zero being the highest priority level and level seven being the lowest. In order to minimize the time required to answer an interrupt request, the processor provides a complete set of registers for each of the eight levels. When an interrupt causes the initiation of a new process, the current process is left intact in the registers assigned to the current level. Control may be returned to the interrupted process simply by reactivating that process level. The need to safestore and restore interrupt processes is eliminated, along with the accompanying overhead.

There are typically 16 registers 130–133 for each level in the 128-word processor scratchpad registers of each processor 103–106. Since level zero may never be interrupted, the process state register for level zero is never transferred to the scratchpad memory; however, register 0 of level 0 is utilized to hold a control block base which contains the base address in memory of the exception control block or the interrupt control block which in turn is utilized to provide the address of an interrupting or interrupted process. (See Steering Code Generating Apparatus for Use in an Input/Output Processing System of G. Wesley Patterson, et al., U.S. Ser. No. 562,362, filed on an even date with the instant application and assigned to the same assignee as the instant application).

The interrupt and dispatcher mechanism invention constantly monitors both the current process level of the processor and all requests for interrupt from any module attached to any port A–L or $LM_0$, $LM_1$, $RM_0$, $RM_1$ of system interface unit SIU 100 of FIG. 1. Each interrupt request specifies the number of the processor to be interrrupted, the priority (level number) of the request, and addresses to identify the interrupt requestor. This information is held in each module which may request interrupts, and for most modules it can be set using programmable interface commands. (See Programmable Interface Application).

Whenever an interrupt request is present at a level higher than the current level, the SIU 100 raises the higher level interrupt present line to the cognizant processor. If several interrupt requests are present at an equal level, the interrupt invention determines which request is to be passed on to the processor on the basis of priorities established by port number or peripheral unit number.

A release instruction REL is used to exit the process. The dispatcher mechanism dispatches data to the processor upon request from the processor in order to give control of the processor to the highest priority request on the highest priority port.

DESCRIPTION OF THE PREFERRED EMBODIMENT OF THE INVENTION

Figure 1:
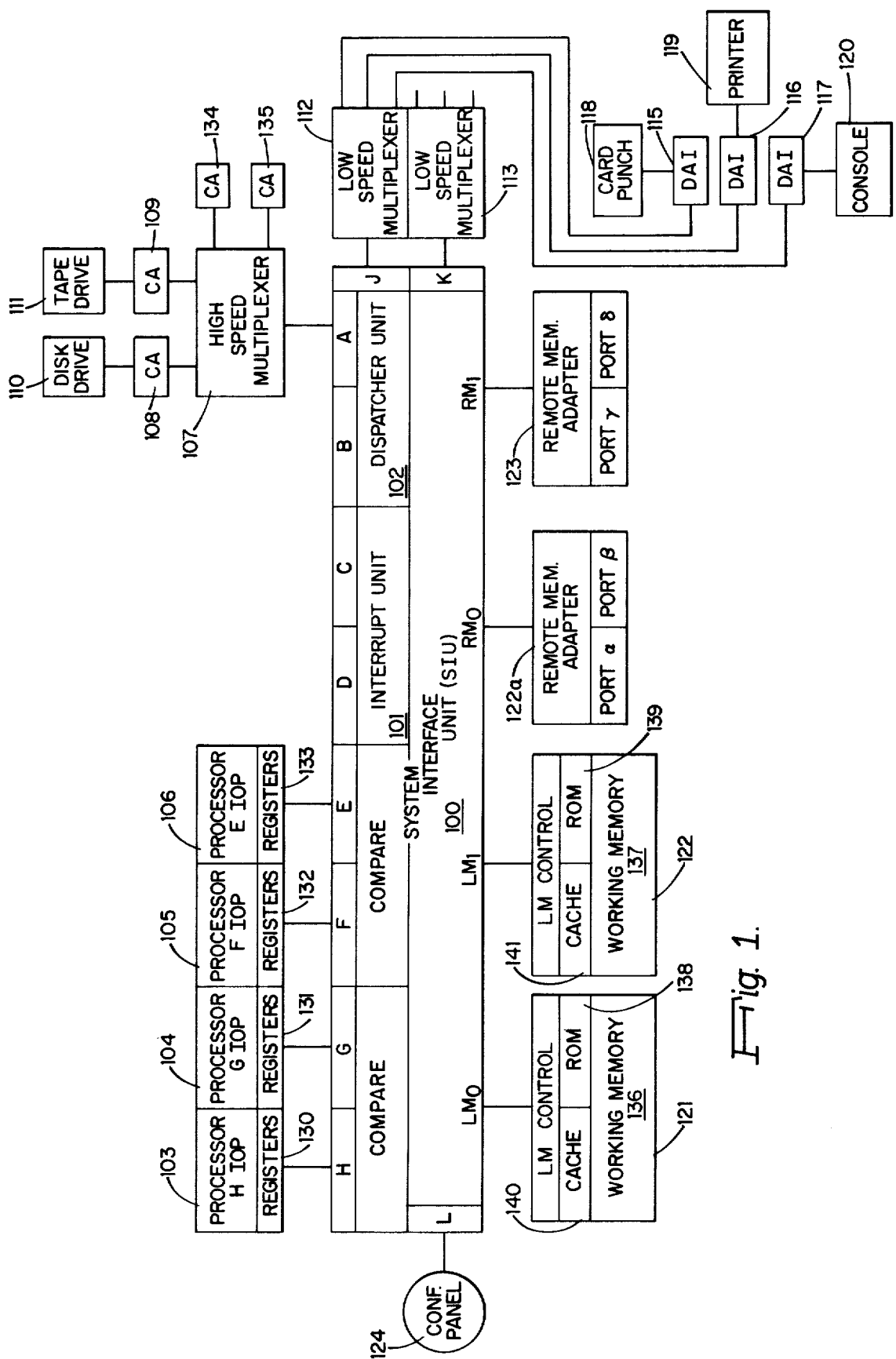
FIG. 1 is a schematic block diagram of a typical computer system utilizing the invention.

Referring now to FIG. 1, there is shown a typical computer system utilizing the invention. The System Interface Unit (SIU) 100, containing the priority interrupt and dispatcher unit mechanisms 101 and 102 respectively, provides connections between the elements of the computer processing system. In addition to providing for access of local or remote memory 121, 122 and 122a, 123 respectively by the active module processors 103–106, configuration panel 124 etc., the SIU 100 provides for direct addressing of the high and low speed multiplexors 107 and 112, 113 respectively and control adapters 108, 109, 134 and 135 by the processors 103–106.

The interrupt unit 101 and the dispatcher unit 102, to be more fully described infra, control the interrupt discipline and perform processor dispatching as required.

Each processor 103–106 typically contains 16 registers 130–133 for each level of priority assigned to a process or a total of 128 register processors capable of storing 128 words. (These registers are sometimes referred to in this specification as the scratchpad memory). Each processor is a general purpose computer processor with a conventional complement of register-register, register-memory, immediate, branch, bit field and shift instructions. These processors may be used as input/output processors (IOP) whose functions include initiation and termination of I/O command sequences, fetching, checking and translating channel programs, and direct control of low speed peripheral devices such as unit record and data communications equipment. Processors 103–106 are attached to and communicate with the SIU 100 via ports H, G, F and E respectively.

The processor local memories 121, 122 communicate with the processors 103–106 via the interface unit SIU and ports $L_{M0}$ and $L_{M1}$. Each of the local memories 121, 122 is organized as a read-write store 136, 137 respectively, plus read only memory ROM 138, 139 with an optional cache memory 140, 141. Width of the local memory interface $LM_0$, $LM_1$ is 36 bits plus four bits for parity. Local memory size is typically 256K or 512K bytes wherein each K is equal to 1024 bytes.

The remote memory adapters 122, 123 are utilized when the SIU with its processors and peripherals are part of a larger general purpose computer system. The Remote Memory Adapters (REMA) 122a, 123 then provide a means of exchanging control and data transfers between the processors 103–106 and a Central System Interface Unit of the larger general purpose computer system not shown herein. Up to 2 ports $\alpha$, $\beta$ and $\gamma$, $\delta$ for each of the REMA units 122a, 123 respectively are provided, each port having a 40-bit data path for input and 40 bits for output between the computer system shown and described herein and a larger computer system not shown herein. The REMA units 122a, 123 are connected and communicate with the SIU 100 via ports $RM_0$ and $RM_1$.

A high speed multiplexor 107 provides direct control of data transfers between high speed peripheral devices (disk drive 110, tape drive 111) and remote 112a, 123 or local memory 121, 122. The high speed multiplexor 107 interfaces between the SIU and the peripherals via ports A–F.

Each low speed multiplexor 112, 113 permits direct control by a processor 103–106 of a low-speed device such as card punch 118, printer 119 and console 120, via ports J and K and device adapter interface unit DAI 115, 116 and 117 respectively.

Figure 2:
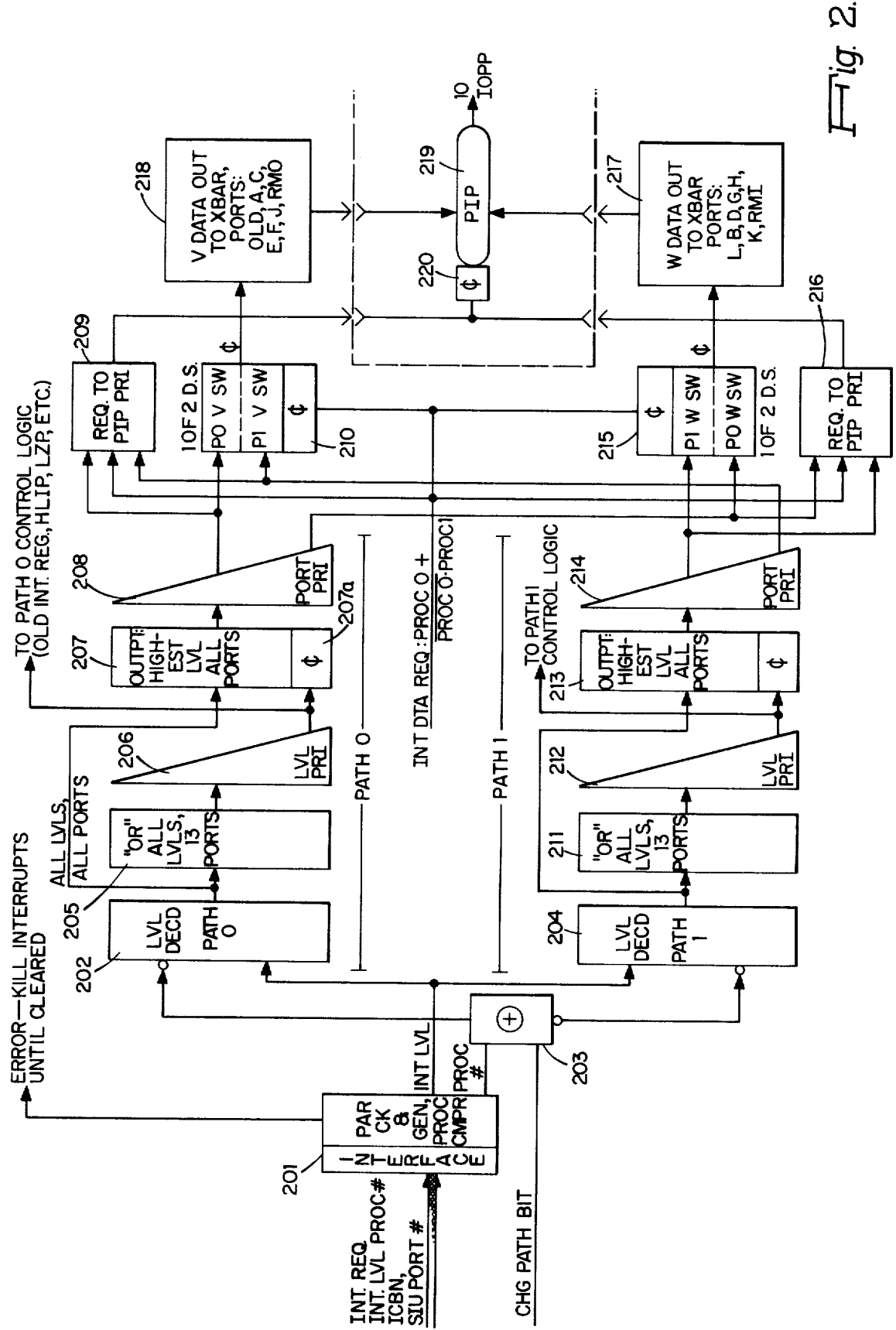
FIG. 2 is a schematic block diagram of the invention.
Figure 3:
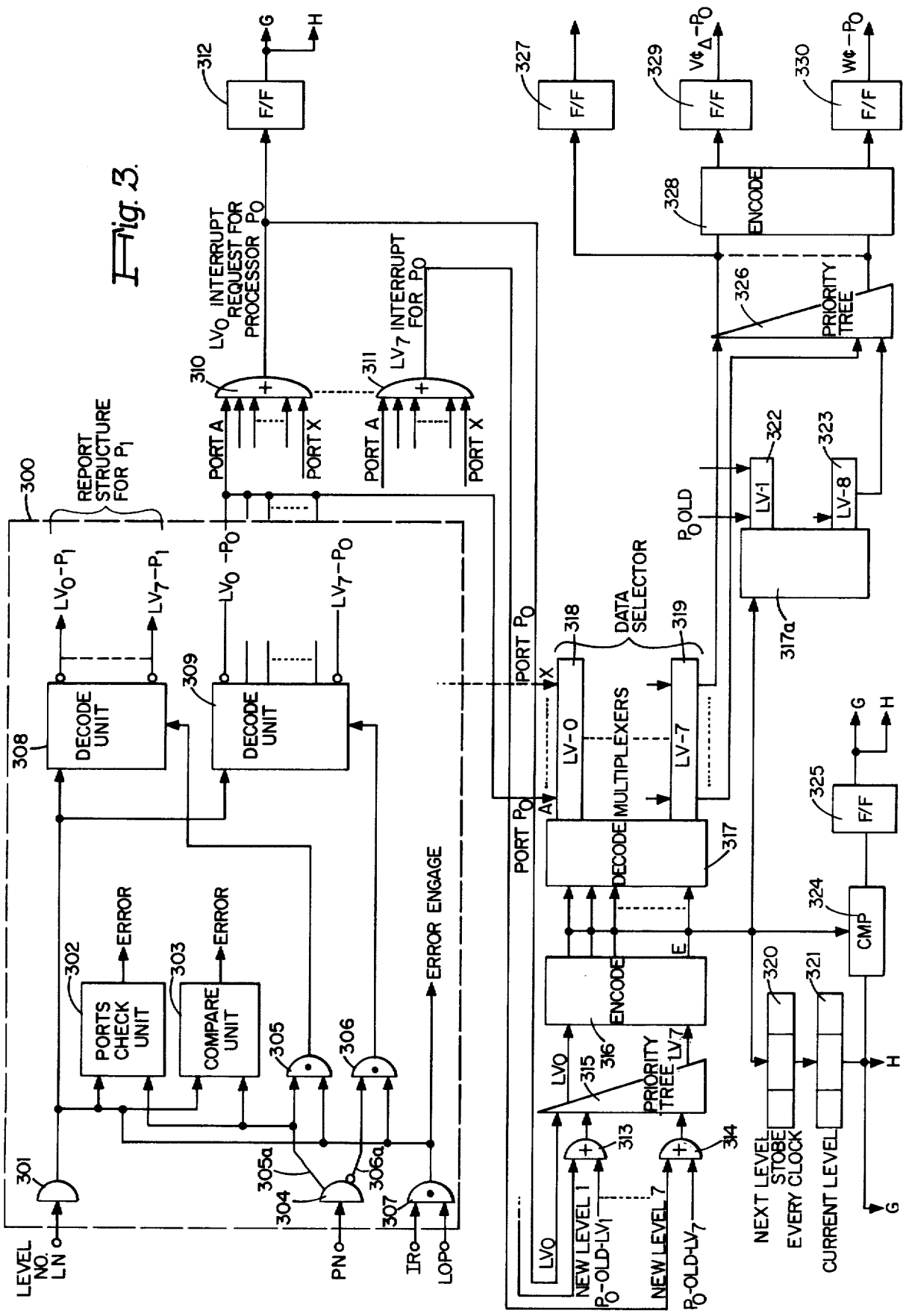
FIG. 3 is a schematic logic block diagram of the priority interrupt mechanism of the invention.
Figure 4:
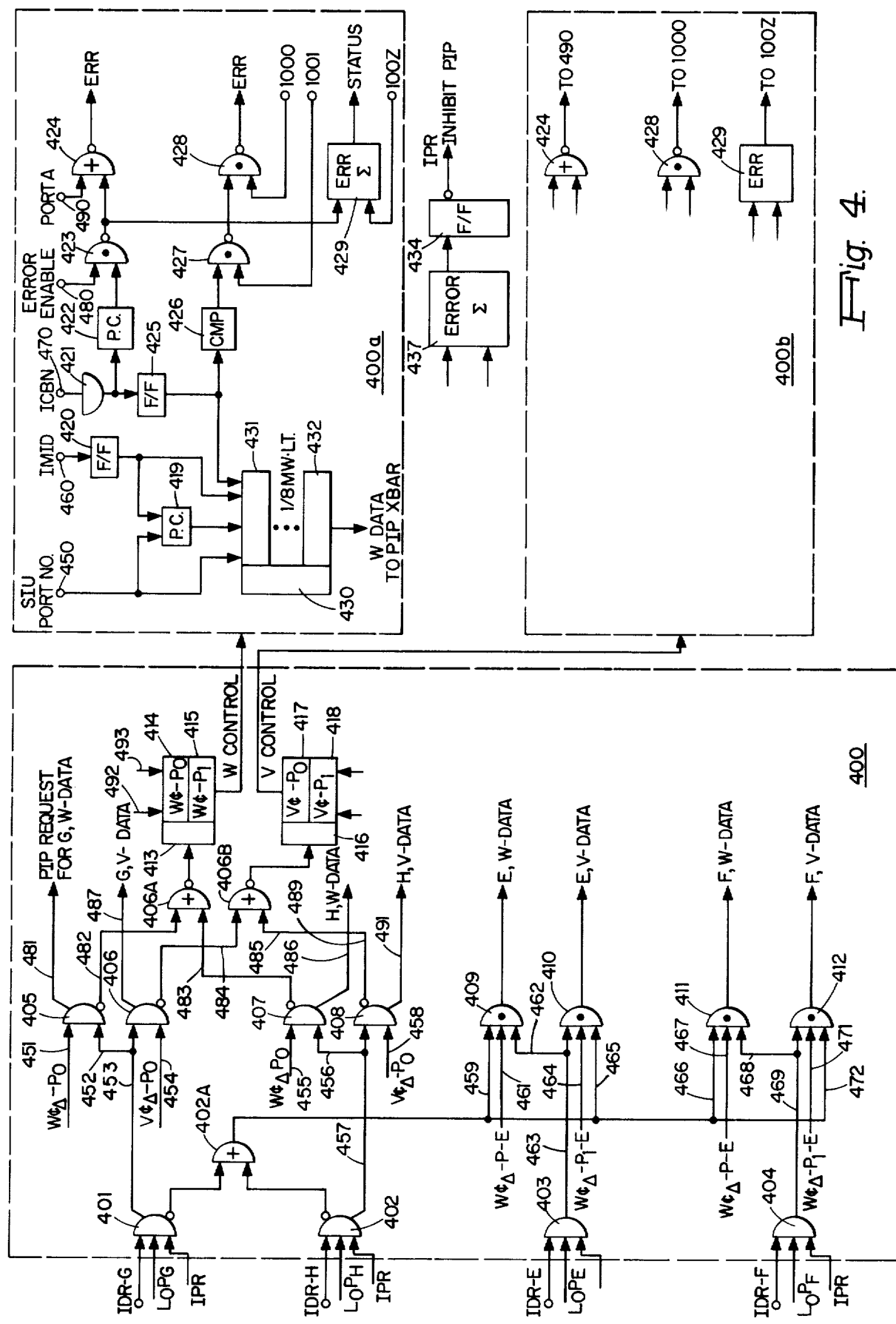
FIG. 4 is a schematic logic block diagram of the dispatcher mechanism of the invention.
Figure 5:
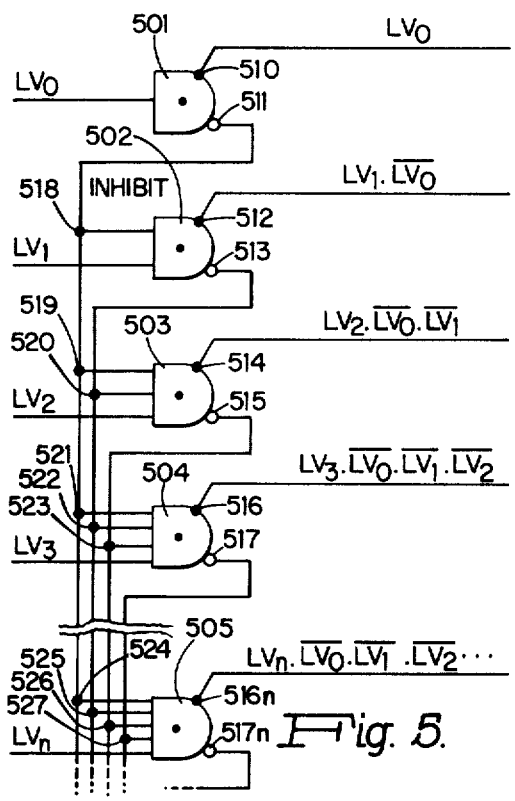
FIG. 5 is a logic block diagram of the priority tree utilized in the invention.

Referring now to FIG. 2 there is shown a block diagram of the interrupt and dispatcher mechanism which are shown and described in greater detail on FIGS. 3–5. An interface unit 201 may typically be the system interface unit (SIU) of FIG. 1 which provides the interfacing paths and control for all the communication between processors and all systems modules. Interrupt requests to the processors 103–106 may come from any units attached ports A through L and $LM_0$–$RM_0$. An interrupt request presented to the interface 201 is accompanied by such pertinent information as the interrupt level, processor number and interrupt control block number. A parity check is performed on this information in unit 201 to determine that the correct information is presented to the priority interrupt hardware and if an error is discovered, a kill-interrupt signal is raised on line 201a. Additionally, since processors 103 and 104 on ports H and G respectively and processors 105 and 106 on ports F and G may operate as processor pairs respectively, a comparison of the interface number on which they are operating is made to determine that the appropriate processors are paired together. Typically processor 103 is paired with 104 and when paired in this manner is called processor 0 in this disclosure; alternately processors 105 and 106 are paired together and are regarded as processor 1 in this disclosure when so paired. Accordingly, the interrupt level number upon being checked for correctness is presented to the level decode units 202, 204. If an error is discovered during this check, the interrupt request is aborted until the error is cleared; however, if no error is presented, then the processor switch 203 selects one of the two processor paths 0 or 1 for processor pair 0 or 1 in accordance to the process number and CHG path bit presented to it. The change path (CHG) control bit provides software with a means to cause the path 0 or the path 1 logic (FIG. 2) to be used in order to get an interrupt request to either processor. Its a redundancy feature that will allow an interrupt to a processor even if there is a hardware failure in the path 0 or path 1 logic i.e. change and use the other logic tree. (See references B and C incorporated herein by reference). For illustration purposes it is assumed that processor path 0 has been selected by the switch 203. The level decode unit 202 decodes the interrupt level which is presented to it as a three bit binary number and presents the decoded information to OR gate circuitry 205. As will be more fully described herein, the OR circuitry 205 collects all the level numbers from all the ports attached to the SIU 100 and provides level numbers if they are present in any of the ports to the level priority circuitry 206. The level priority circuitry 206 to be more fully described infra with respect to FIG. 5 determines the highest level priority number which is present and if the highest level priority number present is 0, (i.e. 0 has the highest priority level and 7 has the lowest priority level), then the interrupt signal is presented immediately to the path 0 control logic so that the processor is immediately interrupted. However, if none of the ports have presented a 0 interrupt level but some of the ports have lower interrupt level number present, for example, priority three through seven, it is obvious that according to the convention adopted herein that 3 has the highest level priority for the next clock cycle. A comparison is then made in comparator 207 to determine if the level 3 priority interrupt, which some ports are requesting in this example, is higher or lower than the level number of the process currently executing. Carrying the present example further for illustration purposes, assume that the interrupt level number 3 has a higher priority than the currently executing process which is somewhere below 3, i.e. 4, 5, etc. However, because there are many ports in the SIU which have many requestor units coupled to it, more than 1 unit can simultaneously be asking for an interrupt and more than 1 unit can simultaneously have the same priority level number. Obviously the processor requested cannot be assigned to more than one processor simultaneously; accordingly, a determination is made to determine which process is to receive control of the processor requested when two or more ports simultaneously make an identical level request i.e. in this example a level 3 request. Determination is made in accordance to predetermined and fixed priorities assigned to the different ports of the SIU. Accordingly, a multiplexor 207 is presented with all those port identifications A through L, $RM_0$ or RM that have requested processor 0 for the highest priority level task, in this example level 3. Since all those ports A through $RM_1$ have different priorities in the hierarchy of performing tasks and this priority is predetermined, then a determination is made in port-priorty unit 208 which port A through L or $LM_0$-$RM_1$ is entitled to receive control of the processor when more than 1 of these ports have made the same level priority task request. Once the final determination of this priority is made and the appropriate processor notified that a higher priority task is waiting to be performed, then no further actions are required of the priority interrupt mechanism until such time as the requested processor asks for the interrupt data. The data from the highest priority port which has the highest priority level interrupt request is available to a passive input (PIP) cross bar 219 through either a V switch or a W switch mechanism 210, 218, 215, 217 respectively on a request from the processor via request logic 209, 216. The V switch control mechanism 210 develops control signals for providing data to V switch 218 from ports A, C, E, F, J, $RM_0$ and an old interrupt. Similarly the W switch control unit 215 develops signals to provide data to W switch 217 from ports L, B, D, G, H, K, $RM_1$. Depending therefore which set of control signals have been developed for the highest priority port which has the highest priority interrupt request either the V switch or the W switch 218, 217 respectively will make data available to the processor via the PIP cross bar 219 via control logic 220.

Referring now to FIG. 3 a detailed logic block diagram of the interrupt mechanism is shown. In order to clarify the invention and not clutter up the explanation with hardware which is merely repetitive as to the requesting port or as to the requested processor, FIG. 3 shows the interrupt mechanism for one processor pair $P_0$ comprising processors H and G, 103 and 104 respectively; the interrupt mechanism for processor pair $P_1$ comprising processors F and E, 132 and 133 respectively is similar to FIG. 3. Moreover, the hardware directly interfacing with the SIU 100 and the priority interrupt unit for each processor $P_0$, $P_1$ is enclosed by dash line 300 and is repeated once for ports G and H (processor 0) and once for ports E and F (processor 1). It is to be understood therefore that there are as many port interface units 300 as above described and moreover that there are also as many priority interrupt networks as there are processor pairs.

In order to initiate a processor interrupt, an interrupt request signal IR is applied to an AND gate 307 from the port making the request which is associated with this particular one of the port interface units 300. Concurrently the requesting port supplies a level priority number LN for the request to gate 301 and also a processor number to gate 304. However, since the SIU 100 is not permitted to respond to any request from any module which is not logically operational, an LOP signal is also applied to AND gate 307. With both the interrupt request IR signal and the IOP signal high AND gate 307 is enabled and provides a high input signal to one input terminal of each of AND gates 305 and 306 respectively. It also permits the level number data which is a three bit binary number applied to gate 301 to be checked for parity in parity checking unit 302 by providing an enabling signal to it. Since only two processor pairs are considered herein, although the invention may utilize any number of processor pairs, a one bit binary number is sufficient to select processor pair P0 or processor pair P1 as desired. Accordingly, when the one bit processor number PN is applied to gate 304, one output terminal 306a of gate 304 will be low. (An amplifier and an inverter may be used in practice). With the signal on output terminal 305a high, a high input signal is provided on one input terminal of AND gate 305 thus enabling AND gate 305 and selecting decode unit 308 for processor P1. By the same token, since the other output terminal 306a of gate 304 is low, the input signal on the other input terminal of AND gate 306 is low, and AND gate 306 is not enabled; thus decode unit 309 is not activated for processor P0. By providing a different input code for the processor number PN, the procedure would be reversed and the decode unit 309 for processor P0 would be selected over the decode unit 308 of processor P1. Upon the selection of the appropriate processor pair, two checks are performed. As has already been noted, a parity check is performed in parity check unit 302 on the 3 bit level number LN and the 1 bit PN. (Parity generator and checker circuits are commercially available through such companies as Texas Instruments Inc., see pages 9–309 of the Integrated Circuits Catalog for Design Engineers, published by Texas Instruments Inc.). If an error is detected, the interrupt request is aborted, whereas if no error is detected, the level number data is sent to decode unit 308 or 309 of the selected processor pair $P_1$ or $P_0$. For purposes of simplification, we are assuming in this discussion that processor $P_0$ has been selected in which case level number data is sent to decode unit 309. Another check is performed by the compare unit 303 to verify that every output line on the interface in the SIU from one member of a processor pair, agree with the corresponding line from the other member of pair. If they do not agree at any clock time, an error state is entered and the interrupt request is aborted.

Having selected the appropriate processor and the appropriate decode unit and having checked the information and the processor pair for correctness, the three bit level number is decoded in either decode unit 308, 309. In this instance since it is assumed that processor pair $P_0$ has been requested, that decode unit 309 will be performing the decoding. (Decoders are commercially available from such companies as Texas Instruments Inc., see pages 9–149 through 9–213 of the Integrated Circuits Catalog for Design Engineers published by Texas Instruments Inc., of Dallas, Texas).

The level number from a given requesting unit having been decoded by its appropriate decode unit 309 will be applied in its decoded state to a series of OR gates 310–311. (Note that for each processor pair $P_0$ and $P_1$ there are as many OR gates as there are predetermined levels of priority of interrupting requests. In this example since there are eight levels of priority the 0 level being the highest priority, there will be eight OR gates 310–311 for processor pair 0 and eight OR gates similar to these for processor pair $P_1$). The output of each OR gate when enabled provides a signal which is indicative of the level of interrupt with which that particular OR gate is associated. Each OR gate 310–311 has as many ports as there are ports on the system interface unit SIU 100. If there is a highest level interrupt (i.e. a level 0 interrupt) on any of the ports of the SIU 100, OR gate 310 which in this example is associated with the level 0 interrupt, OR gate 310 will provide a high output signal. Since a level 0 interrupt requires immediate attention, the signal from OR gate 310 will be stored in flip-flop 312 until the next clock period whereupon it is then presented to the appropriate processor pair $P_0$ via the appropriate ports G, H in the SIU. However, if there is a priority request lower than level 0 as indicated by a high output signal on any of the OR gates between 310 up to and including gate 311, then a determination must be made as follows: first determines the highest priority request on any port during the clock cycle that a request is made, and secondly after having determined the highest priority request determine whether or not that highest priority request is higher than the priority of the process currently executing on the processor. Accordingly, all the output signals from the series of OR gates 310–311 are applied to a priority tree 315, which will be described more fully infra with respect to FIG. 5, via a series of OR gates 313, 314. Note that the output level signals representing levels 1–7 are applied one each to an OR gate in the series of OR gates 313–314. Also note that an additional input signal is applied to one each of the series of OR gates 313–314 which represent old levels of priority of processes which were interrupted at some time previous in order to perform a higher priority task. Therefore, it is apparent that not only are the signals representing a level of priority for a new requesting process applied to the priority tree, but also those signals representing a level of priority of processes that have been previously interrupted and were unable to complete their task. Accordingly the priority tree 315 evaluates all levels of priority present and past, and selects only the highest level existing during the current clock cycle. At any point in time only one high output signal representing the highest level of priority exists. This existing level of priority is then encoded in encoder 316 into a three bit binary number representing the highest level of priority currently existing in the requesting and interrupted processes. This priority number is: (a) strobed into a three bit holding register 320 for temporary storage in case that the processor decides to enter the new level and; (b) it is compared in comparator 324 with the three bit binary number representing the level of priority of the currently executing process which is stored in register 321. If a priority level number of a requesting process or a prior interrupted process is higher than the priority level number of the currently executing process, then a signal is applied to flip-flop 325 which is then transmitted to the appropriate processor pair, in this instance processor pair $P_0$, via ports G, H. Note that the processor has not been interrupted but rather a signal has been conveyed to it, that there is a process waiting which has a higher priority level number than the currently executing process whereupon the processor itself then takes the appropriate action during the next clock cycle.

It should be noted that up to this point in the discussion, the port which is requesting a processor to perform a higher priority task than the currently executing task has not as yet been identified. It could be that, since there are multiple ports, more than one port is requesting the same priority level interrupt as another port. Therefore, hardware is provided to detect such a condition and determine which port is entitled to receive control of the processor. The hardware provided to determine this is in the form of a decode unit 317 which decodes the previously encoded three bit binary number. The hardware also includes a series of multiplexors 318–319, each multiplexor associated with a given priority level number, and each multiplexor having as inputs the decoded priority level numbers from all the ports in the SIU 100. (Multiplexors are commercially available from the above mentioned Texas Instruments Inc., of Dallas, Tex.). Hence, priority numbers have been assigned not only on the basis of priority level of the requesting task or process, but also priority numbers have been assigned in a predetermined fashion to each port of the SIU 100. Generally, the highest priority numbers have been reserved for those ports to which are attached data moving devices such as high speed multiplexors into or out of a system, and the lower priority numbers have been assigned to those ports which are associated with low priority attachments such as memories. Accordingly, when the highest priority level of a requesting process is decoded in decoder 317 that signal will be applied to the multiplexor indicating that level of decoded priority. The multiplexor which may typically be a 1 of 8 or 1 of 13 or whatever is needed to cover the number of ports on the SIU 100, will identify all those ports which have the highest level priority request during the currently executing clock cycle. The signals from all those ports having the current highest priority request are then applied to a priority tree 326. Also the output signals from decoder 317a and the series of multiplexors 322–323 representing priority of prior interrupted processes are applied to priority tree 326. Priority tree 326 therefore considers all ports with the highest level of priority that are currently requesting an interrupt or that have been interrupted at a prior clock cycle and have not completed their tasks. Priority tree 326 from this input information then selects that port having the highest priority which also has the highest level priority request on it. An output signal from priority tree 326 representing that port is then applied to encode unit 328; the encoded result is then temporarily stored in flip-flops 329 or 330 and applied to the appropriate V switch or W switch of processor $P_0$ or $P_1$. Flip-flop 327 is used to hold the fact that the highest level request from the highest priority port is either a new request or an old request which is to be resumed. This information is supplied to the processor when the processor is ready for the next process.

A release instruction (not shown herein) (REL) is used to exit processes entered as the result of an interrupt. After a REL the SIU selects for execution the highest priority process waiting for the processor.

This process may be one that was previously interrupted, or a new process to be inititated as the result of an interrupt request. At the same priority level, previously interrupted processes have priority over new interrupt requests. Through hardware (see reference B supra) and software loading of the PCR, (shown in reference C supra), a processor may present to the SIU an interrupt at any level, 0–7. However, in order to provide a well-defined response to a REL executed at any level, the PCR bit requesting a level 7 interrupt is always set.

If a new process is to be entered as a result of a REL, the processor response is similar to that triggered by a normal interrupt, including acceptance of an interrupt word from the SIU and access to an ICB (see reference C supra). If a previously interrupted process is to be re-entered, the SIU supplies only the level number and the fact that an old process is to be reentered. Since the process state at the time of its interruption is intact in the register scratchpad, this is the only information required to restart the process.

Referring now to FIG. 4 there is shown the dispatcher mechanism which dispatches the data from the appropriate port to the processor requesting such data. The priority interrupt mechanism of FIG. 3 having identified that there is either a level 0 request or a request that has a higher level of priority than the currently executing process has provided a signal apprising the appropriate processor of this condition. The appropriate processor then requests the data which must be dispatched to the correct processor via a V data switch 218 or a W data switch 217 through the passive input cross bar PIP 219. Accordingly, a control mechanism 400 is provided to develop the control signals for selecting the W data output unit 400a or the V data output unit 400b. Note by referring to FIG. 1 and FIG. 4 that processor pair $P_0$ comprising of processors 103, 104 respectively communicate with other port units via ports H and G in the SIU 100 respectively. Similarly, processor pair $P_1$ comprising processors 105, 106 communicate with other ports via ports F, E respectively in SIU 100. Accordingly, therefore, when processor $P_0$ makes a request for data it makes this request through ports H and G and it also receives data through ports H–G respectively via W data output unit 400a or via V data output unit 400b. The same rationale holds when a request is made by processor pair $P_1$ via ports E, F. The data of the highest level priority process from the highest level priority port to be dispatched to the processor is available to either the W data output unit 400a or the V data output unit 400b. The W or V control unit 400 develops the control signal to select the appropriate one of the W or V data output units. (On FIG. 4 the details of only the W data output are shown with the V data output unit having similar details). Once having been notified that there is a higher priority level request awaiting the appropriate processor requires the following data in order to effect a proper transfer of control to the requesting process:

a. the system interface unit SIU port member available on terminal 450; the interrupt multiport identifier IMID available on terminal 460; the interrupt control block number ICBN available on terminal 470; and the error enable signal EE available on terminal 480. The SIU port number identifies the port on SIU to which information is to be sent; the ICBN identifies the control block which has addressing information (see reference B supra); and the error enable signal on terminal 480 and also on terminal 1001 available through software that instructs each module via the SIU to ignore certain classes of error i.e. ignore parity, etc. Part A is utilized to provide the "OR" of all ICBN parity checks, because a part of the interrupt requesting ports are checked in the W switch unit, whereas others are in the V switch unit, and only one signal must be generated to indicate a specific class of errors. Accordingly the logic "ORing" of two like fields are performed in OR gate 424 from the inputs of Part A and AND gate 423.

When the interrupt of the processor is finally effected, the information in registers 130–133 of the interrupted processors need not be removed since there are 16 registers for each priority level as previously discussed. (See also the application of Marion G. Porter, et al., entitled, Processor for Input/Output Processing System, having U.S. Ser. No. 562,317 and assigned to the same assignee as the instant application and filed on the an even date with the instant application).

Referring now to FIG. 4 in greater detail the W or V control unit is conditioned by applying the inhibit PIP requests (from 437, 434) IPR to an input terminal of gates 401–404. This is the signal that has been developed via the error detection hardware 347, 434 of FIG. 4 and indicates that no interrupt data should be moved from the port with bad data. Also a logically operational signal is applied to another input terminal of gates 401–404 to indicate that the processor attached to that port which is requesting the data is operational i.e. power is turned on, the system is on and physically connected to the appropriate port and is not in an initialized state etc. With the dispatcher unit thus conditioned when an interrupt data request on any of ports G through F is applied to the appropriate gate 401–404, that gate or gates will be enabled. Continuing the instant example where processor pair $P_0$ comprising processors 103–104 coupled to ports H, G is making the request, gates 401–402 would be enabled. If both processor pairs $P_0$ on ports G and H and processor pair $P_1$ on ports E and F ask for data at the same time by providing an interrupt data request IDR to all gates 401–404 at the same time, processor pair $P_0$, ports G and H would take preference over processor pair $P_1$, ports E and F. This is effected by an inhibit function which is presented to AND gates 409, 410, 411 and 412 via AND gate 402a. Note that when gates 401 and 402 are enabled a high signal is presented as one input to gates 406 and 408 via input terminals 453 and 457 respectively; however, an inverse or a low signal is presented to OR gate 402a. Since neither of the input signals applied to OR gate 402a are high when gates 401 and 402 are high, then there will not be a high output signal from OR gate 402a and accordingly a low signal will be provided as one of the input signals to AND gates 409–412 via input terminals 459, 465, 466 and 472 respectively; thus AND gates 409–412 cannot be enabled when this set of conditions apply and processor $P_0$ coupled to ports G, H will be enabled and will take preference over processor $P_1$ coupled to ports E, F. When processor $P_0$ asks for the interrupt data from the interrupt requestor, it does it through the predetermined ports G, H which may be either in the W or the V data output unit. Accordingly, the W signal for processor $P_0$ on terminals 451 and 455 respectively is high; also the input signal on input terminals 452 and 456 respectively on gates 405 and 407 is high, since it is derived from the high output signal of gates 401 and 402 respectively which are high because processor $P_0$ is making the data request. Therefore, gates 405 and 407 respectively are enabled providing a high signal for G, H port to the passive input cross bar PIP 219 which indicates to the PIP 219 that data will be forthcoming to it via the W data lines in the W data output unit. By similar reasoning since no high signal is applied to gates 406 and 408 respectively on their input terminals 454 and 458 respectively these gates are not enabled and accordingly the V data lines 487 and 491 respectively for the G and H ports are low. Having thus far alerted the PIP cross bar 219 to expect interrupt data from the G, H ports on the W data output unit it must also notify the W data output unit for processor $P_0$ to supply this data. It does this through OR gates 406a and 406b respectively. It will be noted that when output terminals 481 and 486 of gates 405 and 407 respectively are high, the converse is true on output terminals 482 and 483 of gates 405 and 407 respectively. Therefore, terminals 482 and 483 apply a low signal to OR gate 406a when gates 405 and 407 respectively are enabled. With a low signal on OR gate 406a it is enabled and provides a high signal to the multiplexor unit comprising multiplexor elements 413, 414 and 415. (Multiplexor units are described in greater detail infra).

The W control signal developed is applied to W data output unit 400a to indicate that this unit will be supplying data to the passive input PIP cross bar 219. Note by referring to FIG. 2 that the W data output unit 217 on FIG. 2 which is similar to the W data output unit 400a of FIG. 4 selects one port from ports L, B, D, G, H, K and $RM_1$ to supply the data to the PIP cross bar 219. With the W control signal selecting the appropriate W data output unit the port through which data is to be applied to the PIP cross bar is selected by the 1 of 8 multiplexor units 431–432. The interrupt data such as SIU port number, IMID, ICBN are selected by multiplexor unit 431–432 and eventually transmitted to the PIP cross bar 219. However, it will be noted that prior to the application of this data to the PIP various error checks are performed. For example there is a parity check performed on the ICBN number in parity check unit 422. If no error is discovered, then the data is applied during the next clock cycle to the appropriate port via flip-flop 420 or 425. If an error is discovered by parity check 422, a high signal is applied to AND gate 423 which goes low when error signal on terminal 480 is high. This low output signal from AND gate 423 is applied as one input to OR gate 424 which then provides a high signal since at least one of its input terminals is low.

As previously described parity check unit PC 422, AND gate 423 and OR gate 424 are utilized to report parity errors on ICBN's per port. Similarly, CMP 426, AND gate 427 and AND gate 428 are utilized to report compare erros per processor port pairs. ERR unit 249 is a wide OR structure for developing one line of error status for indicating when enabled that there is some error as seen by the interrupt checking devices.

Referring now to FIG. 5 there is shown the detailed logic block diagram of the priority tree 315 or 326. Basically, the priority tree is comprised of as many AND gates as there are levels (315) or ports (325); in this instance (315) there being eight levels there would be eight AND gates 501–505. The AND gates are enabled when all inputs have a high signal. However, a complementary signal is obtained by providing an inverter 511–517n. Therefore, when any AND gate 501–505 is enabled, there will be a high output signal and a low output inverted signal also. Note in the construction of the priority tree that the complementary output signal is applied as an input signal to every AND gate below it. Accordingly, the complementary output signal 511 from AND gate 501 is applied to all AND gates 502–505. Similarly, the complementary output signal 513 of AND gate 502 is applied as one input signal of all AND gates below it 503–505. Hence, when any one AND gate in the priority tree is enabled all AND gates above it and below it cannot be enabled and cannot provide a high output signal. For example, assuming that there is a level 2 request and therefore there is a level 2 signal present which is applied as one input to AND gate 503. Now since there is no level 0 or level 1 signal present, AND gates 501 and 502 cannot be enabled. Therefore, the output signal on terminals 510 and 512 is low and the output signal on complementary terminals 511, 513 is high. Note that the signal from output terminal 511 is applied to input terminal 519 of AND gate 503 whereas the output signal from terminal 513 is applied to input terminal 520 of AND gate 503. Hence all the input terminals of AND gate 503 are high and the AND gate is enabled and the high signal is provided on terminal 514. Also, a complementary low signal is generated on output terminal 515 which is then applied to all AND gates below AND gate 503 and accordingly none of the AND gates 504–505 can be enabled. Hence it is shown that with a given set of level signals present only one AND gate can be enabled allowing a signal to be generated which indicates the highest priority level of all the requestors.

Figure 6:
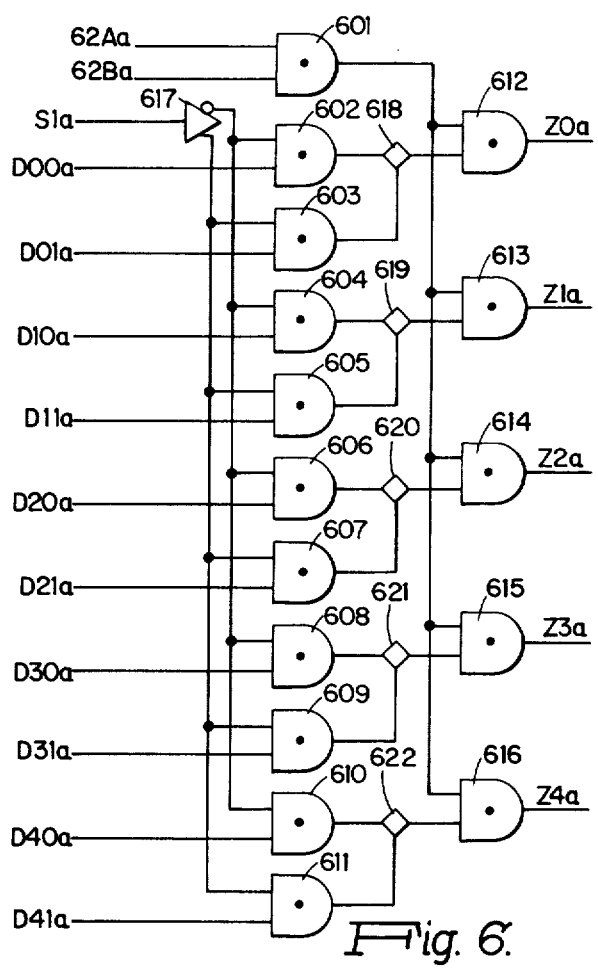
FIG. 6 is a logic block diagram of a one of two data multiplexor utilized in the invention.

Referring to FIG. 6 there is shown a typical 1 of 2 multiplexor. It is comprised of AND gates 601–616 having input data signals D00a to D41a on AND gates 602–611. Enabled signals G2Aa–G2Ba are applied to AND gate 601 and control signal S1a is applied to amplifier/inverter 617. Data out signals Z0a–Z4a are abstracted from AND gates 612–616. Two completely independent five-bit 1 of 2 gated data selection is determined by the S input, whereas the outputs are enabled by the AND gate of the G inputs.

The Boolean expressions for FIG. 6 are as follows where there is a 1 to 1 correspondence between inputs and outputs of FIG. 6 and the Boolean expressions:

For $a = A, B$ $$Z0a = (G2Aa.G2Ba) \cdot ((D00a.\overline{S1}) + (D01a.S1))$$

$$Z1a = (G2Aa.G2Ba) \cdot ((D10a.\overline{S1}) + (D11a.S1))$$

$$Z2a = (G2Aa.G2Ba) \cdot ((D20a.\overline{S1}) + (G21a.S1))$$

$$Z3a = (G2Aa.G2Ba) \cdot ((D30a.\overline{S1}) + (D31a.S1))$$

$$Z4a = (G2Aa.G2Ba) \cdot ((D40a.\overline{S1}) + (D41a.S1))$$

Relating the above elements of FIGS. 6 to the pertinent elements of FIG. 4, there is a relationship as follows: 617 and 413; 602 and 414; 603 and 415; inputs 492 and D00a; input 493 and D01a. Similarly the remainder of the gates and inputs may be paired off as above with units 414 and 415. When control input S1a is 0 it can readily be seen that data on input 493 is switched, whereas then the control input is 1, data on input 493 is switched. (See set of equations above).

Figure 7:
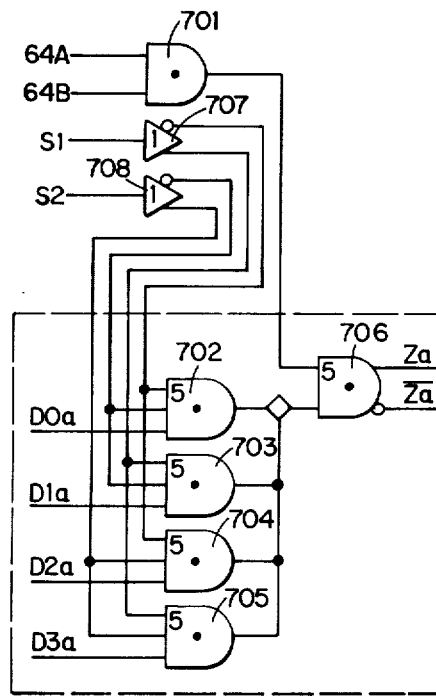
FIG. 7 is a logic block diagram of a one of four data multiplexor utilized by the invention.

Referring now to FIG. 7 there is shown a typical 1 of 4 multiplexor. As in FIG. 6 input data signals are applied to AND gates 702–705, enable signals are applied to AND gate 701 and control signals are applied to amplifier/inverters 707–708 with Data Out signals being abstracted on AND gate 706.

The Boolean expressions for FIG. 7 are as follows: For $a = A, B, C, D, E$ $$Za = (G4A.G4B) \cdot ((D0a.\overline{S2}.\overline{S1}) + (D1a.\overline{S2}.S1) + (D2a.S2.\overline{S1}) + (D3a.S2.S1))$$

Figure 8:
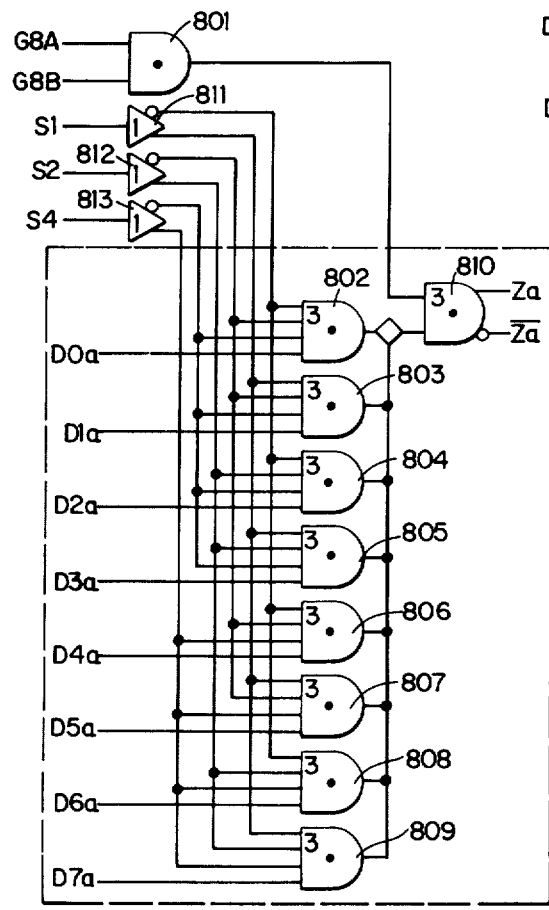
FIG. 8 is a logic block diagram of a one of eight data multiplexor utilized by the invention.

Referring now to FIG. 8 there is shown a typical 1 of 8 data multiplexor. Data In signals D0a–D7a are applied to AND gates 802–809; enable signals G8A–G8B are applied to AND gate 801; and control signals S1–S4 are applied to amplifier/inverters 811–813; while 1 of 8 data is abstracted from AND gate 810.

The Boolean expression for FIG. 8 is as follows:
For $a = A, B, C$ $$Za = (G8A.G8B) \cdot ((D0a.\overline{S4}.\overline{S2}.\overline{S1}) + (D1a.\overline{S4}.\overline{S2}.S1) + (D2a.\overline{S4}.S2.\overline{S1}) + (D3a.\overline{S4}.S2.S1) + (D4a.S4.\overline{S2}.\overline{S1}) + (D5a.S4.\overline{S2}.S1) + (D6a.S4.S2.\overline{S1}) + (D7a.S4.S2.S1))$$

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. In a data processing system having a system interface unit (SIU), a plurality of peripheral units, a plurality of processors and at least one processor of said plurality of processors executing a first one of a plurality of processes having a first level of priority each of said processes having a priority level based on the relative importance of said plurality of processes, and with any of said processes generating signals for requesting control of said one processor, said data processing system further including at least one peripheral channel for each one of said peripheral units, each peripheral channel selectivity coupled to said SIU for communication between any one of said peripheral units and said one processor, each peripheral channel having a priority level based on the relative importance of the peripheral unit associated with its peripheral channel, and with any of said peripheral channels also generating signals for requesting assignment to said one processor, a dispatcher mechanism in said SIU for dispatching data to said one processor by any one of said requesting processes based on priority of said peripheral channel of said requesting process and the priority of said requesting process, said dispatcher mechanism comprising:

a. a plurality of processor communication channels, one each of said plurality of processors coupled to said SIU via one each of said processor communication channels for communication between said any one of said plurality of processors and any one of said plurality of peripheral units;

b. first means responsive to a request signal indicative that a second process of said plurality of processes has requested control of said one processor, said first means for selecting one of a plurality of said processor communication channels;

c. second means in each of said processor communication channels for determining the highest priority peripheral channel of the highest priority second process of said group of processes generating signals requesting control of said one processor;

d. third means, coupled to said second means and to said one processor, for determining the higher priority level between said first one of said plurality of processes and said highest priority peripheral channel of the highest priority second process;

e. fourth means, coupled to said plurality of processor communication channels and to said third means, for receiving data required to effect the transfer of control from said first one of said processes to said second process; and f. fifth means, coupled to said fourth means, for dispatching the data from the highest priority peripheral channel of the highest priority second process to said one processor.

2. The data processing system as recited in claim 1 including in said fifth means, sixth means for checking of accuracy of data to be dispatched by said fifth means.

3. The apparatus as recited in claim 2 including seventh means coupled to said fifth means for inhibiting the transfer of data by said fifth means to said one processor when an error has been found in the data to be transmitted by said fifth means.

4. In a data processing system having a plurality of processors coupled to an interface unit, one of said processors being controlled by a selected one of a first group of processes, said data processing system also having a plurality of peripheral devices also coupled to said interface unit via peripheral channels said processors and said peripheral devices communicating with each other via said interface unit, said data processing system further having a plurality of a second group of processes generating signals for requesting control and competing with each other for said one of said processors, each process of said first and second group of processes and each peripheral device being associated with a predetermined level of priority for assignment to said one of said processors, a dispatcher mechanism in said interface unit for dispatching data to said one of said processors by any one of said requesting processes based on priority of said peripheral channel of said requesting process and the priority of said one of said processors comprising;
 a. first means for determining, prior to interrupting any one of said first group of processes whether or not the highest priority peripheral channel having the highest priority request has a higher priority than said one of said first group of processes;
 b. second means, coupled to said first means, for providing an interrupt signal to one of said processors when said highest priority peripheral channel having the highest priority request has a higher priority level than the currently executing process of said first group of processes on said selected processor;
 c. third means, in said interface unit responsive to said interrupt signal for causing said one of said processors to be interrupted by said selected process; and
 d. fourth means, coupled to said third means for dispatching data to said one of said processors.

5. The apparatus as recited in claim 4 including a plurality of paths, one each of said plurality of processors coupled to said SIU via one each of said paths for transmitting data to any one of said plurality of processors, and further including fifth means in said fourth means for selecting one of said plurality of paths and also including sixth means for transmitting data to said selected processor.

6. The apparatus as recited in claim 5 including parity checking means coupled to said fourth means for checking a parity bit of the data transmitted.

7. The apparatus as recited in claim 6 including seventh means coupled to said sixth means for aborting the dispatching of data to said selected processor when the parity bit of the data transmitted indicates an error in the data transmitted.

8. The apparatus as recited in claim 7 including eighth means coupled to fourth means and responsive to said interrupt signal for receiving data for transmission to said processor.

9. In a data processing system having one processor executing a first one of a plurality of processes each of said processes having a priority level based on the relative importance to the other of said processes, and with any of said processes generating signals for requesting control of said processor, said data processing system having at least one local random access memory and one random access main memory, and a plurality of peripherals with each peripheral having a priority level based on the relative importance to the other peripherals, a dispatcher mechanism for assigning to said one processor the highest priority peripheral having the highest priority request comprising:
 a. first means for determining prior to interrupting any one of said first group of processes whether or not the highest priority peripheral having the highest priority request has a higher priority than said currently executing first one of said plurality of precesses;
 b. second means, coupled to said first means, for providing an interrupt signal to said processor when said highest priority peripheral having the highest priority request has a higher priority level than said first one of said plurality of processes on said processor;
 c. third means in said data processing system responsive to said interrupt signal for dispatching data to said one processor;
 d. fourth means, in said local random memory, for storing information of the highest priority peripheral having the highest priority requesting process; and,
 e. fifth means, responsive to said third means, for addressing said fourth means.

* * * * *

UNITED STATES PATENT OFFICE
CERTIFICATE OF CORRECTION

Patent No. 4,028,664        Dated June 7, 1977

Inventor(s) Earnest M. Monahan & Garvin W. Patterson

It is certified that error appears in the above-identified patent and that said Letters Patent are hereby corrected as shown below:

Column 14, line 27, delete "selectivity" and substitute therefor --selectively--.

Column 15, line 5, delete "of" first occurrence, and substitute therefor --the--.

Column 16, line 46, after "random" insert --access--.

Signed and Sealed this

Fifteenth Day of November 1977

[SEAL]

Attest:

RUTH C. MASON  
*Attesting Officer*

LUTRELLE F. PARKER  
*Acting Commissioner of Patents and Trademarks*